Jan. 11, 1927.

A. G. GEISTERT

VEHICLE SPRING

Filed Nov. 24, 1923

1,613,700

Inventor
Albert G. Geistert
By his Attorneys
Blackmore, Spencer & Hulit.

Patented Jan. 11, 1927.

1,613,700

UNITED STATES PATENT OFFICE.

ALBERT G. GEISTERT, OF DETROIT, MICHIGAN, ASSIGNOR TO GENERAL MOTORS CORPORATION, OF DETROIT, MICHIGAN, A CORPORATION OF DELAWARE.

VEHICLE SPRING.

Application filed November 24, 1923. Serial Noo. 676,759.

The invention relates to vehicle springs, and more particularly to those of the type including a plurality of superposed leaves of graduated lengths, the larger end of the spring constituted by such assembled leaves being secured fixedly to the vehicle frame, as by a suitable bracket, and the smaller end being connected to the vehicle axle.

The invention is of especial utility in connection with, and will herein be specifically described as embodied in, the front springs of an automobile, this type of spring being adapted for and now employed in relatively light cars.

The more distinguishing features of the invention relate to the shape of the spring or its leaves, and to its support or attachment to the vehicle chassis and axle. The individual leaves of the spring are cambered to an initial curvature substantially in the arc of a circle, from which characteristic the spring may be designed a "true-arc" spring. The spring is mounted with the longer leaves at the lower side and with the curvature downward, so that deflection under load will merely add to the degree of initial curvature. Various advantages of this specific form and arrangement of spring are hereinafter pointed out, as well as of the means I have devised for the securing of the spring to the body or chassis to be supported.

In the accompanying drawings, Figure 1 is a side elevation of a part of a motor vehicle chassis having associated therewith an embodiment of my invention.

Figure 1:
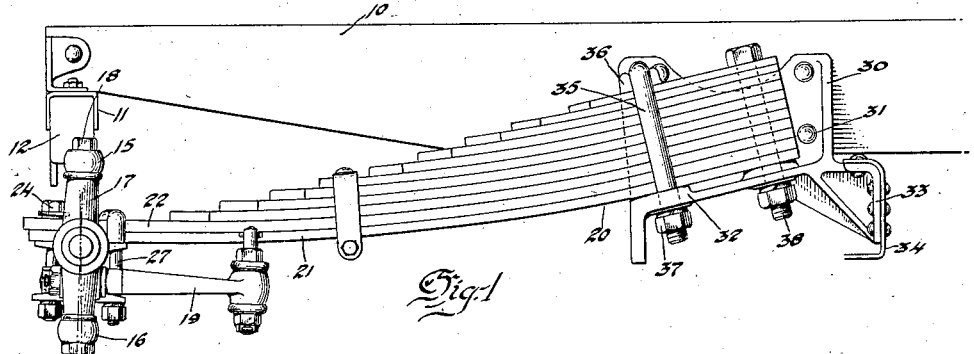
Figure 2:
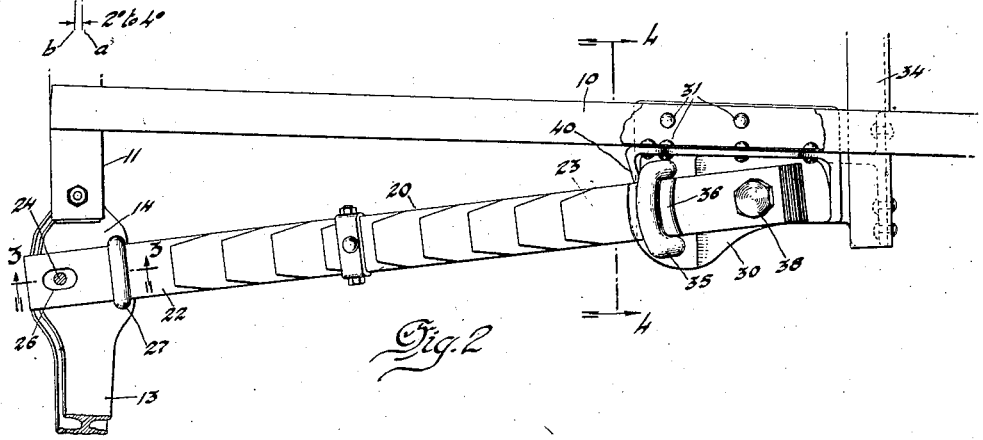
Figure 2 is a plan view of the structure shown in Figure 1.
Figure 3:
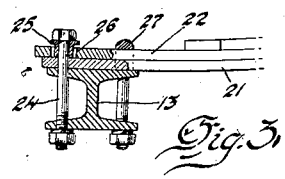
Figure 3 is a section on line 3—3 of Figure 2.
Figure 4:
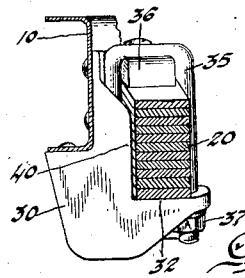
Figure 4 is a section on line 4—4 of Figure 2.

Referring to the drawings, 10 indicates a side member of a motor vehicle chassis frame, which member is shown as of channel form with the open side of the channel inward. A cross member 11 joins the member 10 to a similar side member on the other side of the vehicle, a bumper 12 being secured to the lower side of the cross member.

A front axle 13, preferably of I-beam form, provided with an enlarged portion 14 serving as a spring pad or seat, carries at its outer end the arms 15, 16, between which is mounted the steering knuckle 17 supported on king pin 18 and positioned by steering arm 19. The parts just described are of usual and well known construction and may, of course, be varied as desired.

The spring indicated by 20, which spring will, of course, be duplicated upon the opposite side of the vehicle, comprises the longer leaves 21, 22, and a number of leaves of graduated lengths, the number depending upon the strength of individual leaves and the character of service required, the shortest leaf being indicated by 23. The lower leaf 21 is fixed at its forward end to the axle 13 by bolt 24 passing through both flanges of the axle. A collar 25 surrounding the bolt 24 and positioned beneath the head thereof serves to clamp the leaf 21 to the spring seat. The leaf 22 is provided with an elongated aperture 26 within which the collar 25 is positioned, thus permitting relative longitudinal movements of the two leaves, as required by varying deflection of the spring, and at the same time preventing separation of the leaf 22 from the axle should leaf 21 be broken in service. An additional clamping means may be provided comprising the U-bolt 27, which also prevents lateral play of the leaves while permitting relative longitudinal movements.

The larger or butt end of the spring 20 is secured to the frame member 10 by a bracket 30 which is fixed to the member 10 as by rivets 31. The bracket is formed with a seat portion 32 to receive the spring 20, and also with a rear flange or projection 33 adapted to receive and be secured to a transverse frame member 34, preferably of channel form. The spring 20 is clamped to the bracket by a U-bolt 35 fitting over a saddle piece 36 which rests upon leaf 23. U-bolt extends through apertures in the spring seat portion of the bracket and is firmly secured as by nuts 37. A single bolt 38 passing through apertures in the rear ends of the spring leaves and in the bracket, respectively, secures the ends of the leaves to the bracket. A flange 40 is provided on the bracket adjacent to its forward end, the edge of which fits closely against the edges of the spring leaves in proximity to the U-bolt 35. This provides an abutment to prevent lateral play or shifting of the spring or the leaves thereof, and has been found of marked utility in eliminating wear and shearing of the securing bolts.

It will be understood that the spring bracket for the opposite side of the vehicle will not be identical with that shown, but that the two will be related as "rights" and "lefts."

While I have referred to the spring leaves as being of uniform curvature throughout, and this will be preferable for the longer leaves, it will be understood that a shorter leaf, such as the leaf 23, need not necessarily be curved since its function is chiefly to apply resistance to abnormal deflection of the longer leaves, and it may, in fact, with advantage be made from flat stock.

Figure 5:
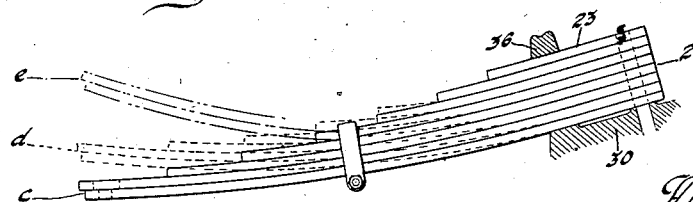
Figure 5 is a diagrammatic view illustrating the operation of the spring.

In the diagrammatic illustration in Figure 5, I have shown at $c$ the position of the spring when not under load, at $d$ the position under approximately normal load, and at $e$ the bumper position, or position of extreme deflection.

For ease in steering it is considered desirable to give the king pin axis a slight "rake" or rearward inclination, this inclination being indicated in the drawings, Figure 1, as amounting to from 2 to 4°, the line $a$ indicating the vertical and the line $b$ the king pin axis. For convenience in manufacture of the front axle, however, it is best to form the spring seat in a plane perpendicular to the central vertical plane of the axle. This necessitates the positioning of the front end of the spring, as the leaves 21, 22, at a slight downward inclination rearwardly. With my improved spring this position is provided for, and at the same time the curvature is sufficient to bring the rear end of the spring to a position immediately adjacent to the side member of the frame and in the horizontal plane thereof, thus simplifying the form of the bracket required at that point, saving a considerable excess of material that would be required if the bracket were dropped to the position necessary if the spring were not curved, and greatly improving the sturdiness of the connection.

It will be understood that the operation of the improved spring will be smoother and more uniform under varying loads than is possible with a spring of S-shape, such as has commonly been employed hitherto in this art, or of other non-uniform curvature. This is due to the fact that the leaves remain in contact throughout their length both in the initial and all subsequent positions, the curvature remaining substantially uniform in the contacting areas of successive leaves whatever the deflection. Furthermore it will be noted that, by reason of the upward curvature of the front end of the spring, the direction of road shocks transmitted through the axle is more nearly transverse to the spring than would be otherwise obtainable, thus contributing to easy riding qualities, relieving the spring, and reducing materially the endwise thrust on the spring bracket and securing means.

The spring described has particular advantages also in the reduction of cost of manufacture. Since the curvature is the same throughout the length and is identical in the successive cambered leaves, the desired camber is obtained simply by rolling the stock to a constant degree of curvature without special machinery or manipulation.

While I have described herein specific details of construction, I do not desire to be restricted thereby, but wish to include all variations falling within the scope of the invention as defined in the appended claims.

I claim:

1. A vehicle spring comprising a plurality of superposed leaves of graduated lengths, one end of each leaf being secured to the vehicle frame and the other end of a long leaf being secured rigidly to the axle, the long leaf and several superposed leaves having initial uniform downward curvature in the arc of a circle.

2. In vehicle spring construction, a frame member, a front axle having a spring seat with a downward inclination rearwardly, a leaf spring secured at its forward end to said seat and curved upwardly in the arc of a circle from the axle, and means for securing the rear end of said spring fixedly to the frame member.

3. In a vehicle spring construction, a vehicle side frame member, a spring comprising a plurality of superposed leaves of graduated lengths, the rear end of each leaf being fixed to said member in substantially the horizontal plane thereof, said spring extending downwardly and forwardly with an initial downward camber in a circular arc in the leaves thereof, a longer leaf having normally an upward direction at its forward end, a front axle, and means for securing said forward end to said axle.

In testimony whereof I affix my signature.

ALBERT G. GEISTERT.